May 27, 1924.
J. T. SIEFERT
ILLUMINATING MECHANISM
Filed May 11, 1923
1,495,615
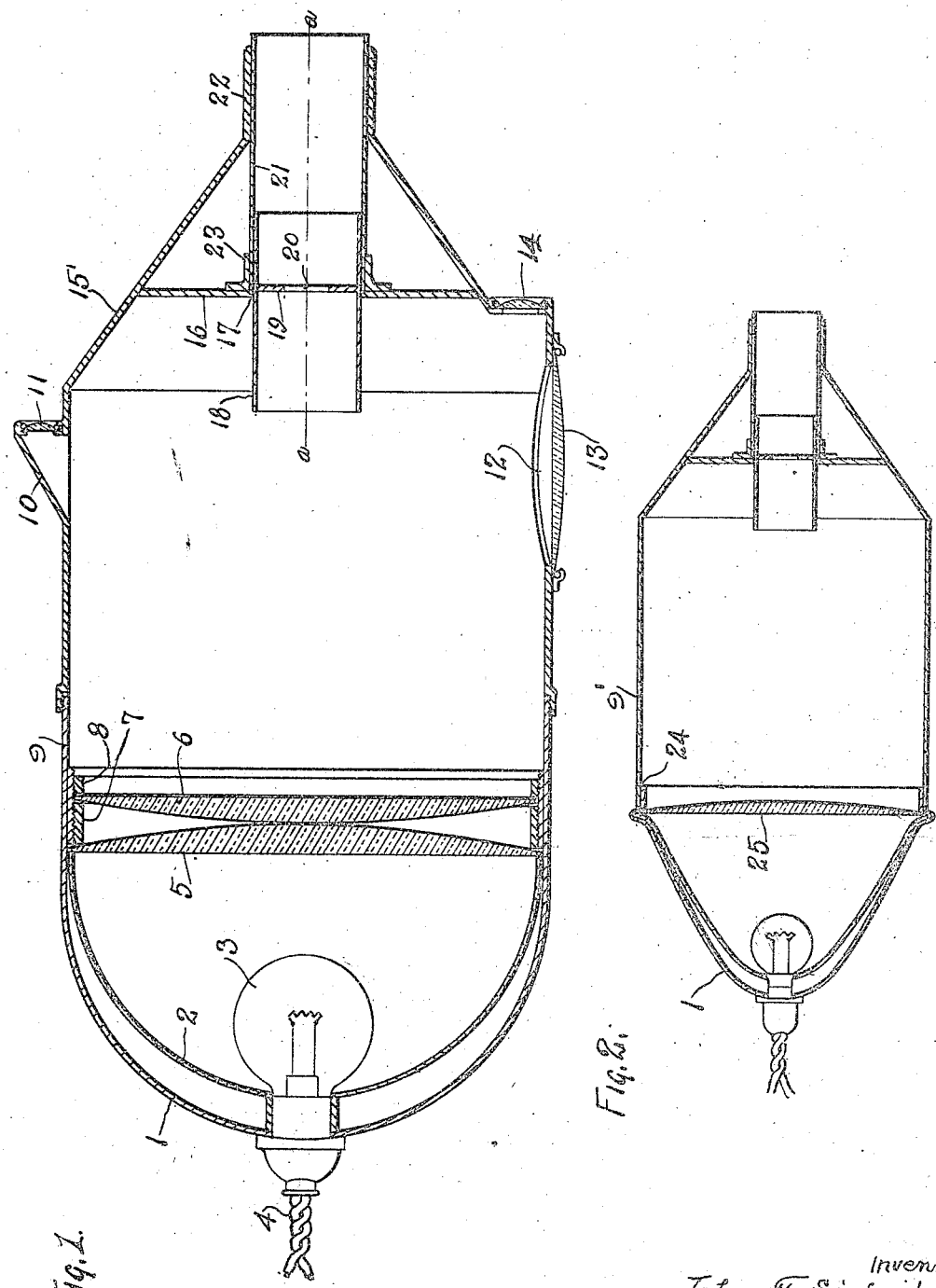

Patented May 27, 1924.

1,495,615

UNITED STATES PATENT OFFICE.

JOHN T. SIEFERT, OF DAYTON, OHIO.

ILLUMINATING MECHANISM.

Application filed May 11, 1923. Serial No. 638,239.

*To all whom it may concern:*

Be it known that I, JOHN T. SIEFERT, a citizen of the United States, residing at Dayton, in the county of Montgomery and State of Ohio, have invented certain new and useful Improvements in Illuminating Mechanism, of which the following is a specification, reference being had therein to the accompanying drawing.

My invention relates to illuminating mechanism, and, in particular, to such mechanism for headlights for automobile equipment.

The object of my invention is to provide an illuminating mechanism which will have a central area of illumination of great brilliancy confined to a predetermined area, with a surrounding area of lesser brilliancy.

It is my object to provide a headlight that has a particularly bright beam of light directed on the road directly in front of the vehicle, at such an angle that it will not interfere with the drivers of other vehicles and their vision, while at the same time providing an area of diffused light which enables the operator of the vehicle carrying the headlight to see the road on either side of the beam of light.

It is my further object to provide, in the same combination, pilot lights on the top of the lamp or headlight, illuminated from the same source of illumination.

It is an additional object of my invention to provide in the same headlight means of illuminating the ground directly in front and adjacent to the front wheels, such illumination coming from the same source of illumination in the headlight.

It is a further object of my invention to provide such an arrangement of parts that my invention may be applied to existing headlights without modifying such headlights.

Referring to the drawings:

Figure 1 is a section through the complete assembly of the headlight combination.

Figure 2 is a modification showing the application of my invention to a standard lamp.

Referring to the drawings in detail:

1 is a lamp housing, having a reflector 2 carried therein for reflecting the light from the electric lamp 3, which is supplied with current by the cable 4.

This lamp may be provided with the ordinary lens, such as found in automobile headlights, or it may be provided with the plano-convex lens 5, and a similar plano-convex lens 6, which are held in position by the retaining ring 7 and the ring 8. These plano-convex lenses have their convex surfaces adjacent to one another, with their plane surfaces respectively adjacent to the lamp and to the front of the mechanism.

The casing 1 is projected into a cylindrical barrel 9. This barrel carries on the top thereof a hood 10 and a lens 11, which are adapted for the purpose of furnishing a pilot light. If two of my headlights are employed, one on either side of the vehicle, I may color one of these lenses red and the other green. At the bottom of this barrel 9 is a cutaway portion 12. Below this cutaway portion is a glass 13 through which light is diffused for the purpose of illuminating the ground adjacent to the front wheels. The lens 14, similar to the lens 11, is provided to further illuminate the roadway adjacent the front wheels by the diffused light passing through.

The forward end of the barrel is converged into a conical structure designated 15. This conical structure has transversely located therein a barrier 16, having an aperture 17 therein. Within this aperture 17 there is located a sliding cylinder 18, which also has a barrier designated 19. This barrier has an opening 20 therein, which is relatively restricted. The cylinder 18 slides within a second cylinder 21, which is carried by an open throat 22 of the funnel-shaped structure 15. The second tubular member 21 is positioned with respect to the barrier 16 by a collar 23.

In Figure 2 will be seen the usual lamp casing 1, upon which is slidingly mounted, as at 24, the casing 9'. By this telescoping arrangement, the forward part of the mechanism embodying my invention may be mounted upon a standard lamp carrying an ordinary lens 25.

In operation, the light furnished by the lamp 3, being reflected by means of the reflector 2, passes through the lenses 5 and 6, which are adapted to converge the rays approximately to the center of the sliding tube 18. It is desirable to have the focus within this tube on a line passing through the center of the tubular members 18 and 21. The area of maximum illumination is on the line a—a. This line passes through the center of the opening 20. This beam illuminates the road in front of the vehicle, and such diffused rays associated with it form a broad triangular-shaped area of illumination, the apex of which is at the outer end of the tube 21, and the base of which is removed from the machine. The depth of this triangular area is approximately eighty feet from an ordinary sized lamp such as used on automotive vehicles, and the base of the triangular area is approximately twenty feet wide, providing sufficient illumination for an ordinary road and the land adjacent thereto.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

1. In combination in an illuminating mechanism, a source of illumination, a reflector, a lens, a casing, a tubular casing connected with the first casing, a funnel-shaped end to said second casing, having an aperture in the apex thereof, a tubular member mounted in said apex of the funnel-shaped portion of the casing, a second tubular member adapted to telescope therein, a barrier in said second tubular member having a restricted opening, said source of illumination and lens with the reflector being so arranged as to focus the light on a line passing through said tubular members.

2. In combination in an illuminating mechanism, a source of illumination, a reflector, a lens, a casing, a tubular casing connected with the first casing, a funnel-shaped end to said second casing, having an aperture in the apex thereof, a tubular member mounted in said apex of the funnel-shaped portion of the casing, a second tubular member adapted to telescope therein, a barrier in said second tubular member having a restricted opening, said source of illumination and lens with the reflector being so arranged as to focus the light on a line passing through said tubular members, a cutaway portion in the bottom of the casing, and a transparent cover for said opening so formed.

3. In combination in an illuminating mechanism, a source of illumination, a reflector, a lens, a casing, a tubular casing connected with the first casing, a funnel-shaped end to said second casing, having an aperture in the apex thereof, a tubular member mounted in said apex of the funnel-shaped portion of the casing, a second tubular member adapted to telescope therein, a barrier in said second tubular member having a restricted opening, said source of illumination and lens with the reflector being so arranged as to focus the light on a line passing through said tubular members, a cutaway portion in the bottom of the casing, a transparent cover for said opening so formed, a cut-away portion in the front of said casing adjacent the bottom thereof, and a transparent cover for said opening.

In testimony whereof, I affix my signature.

JOHN T. SIEFERT.